Patented Jan. 18, 1949

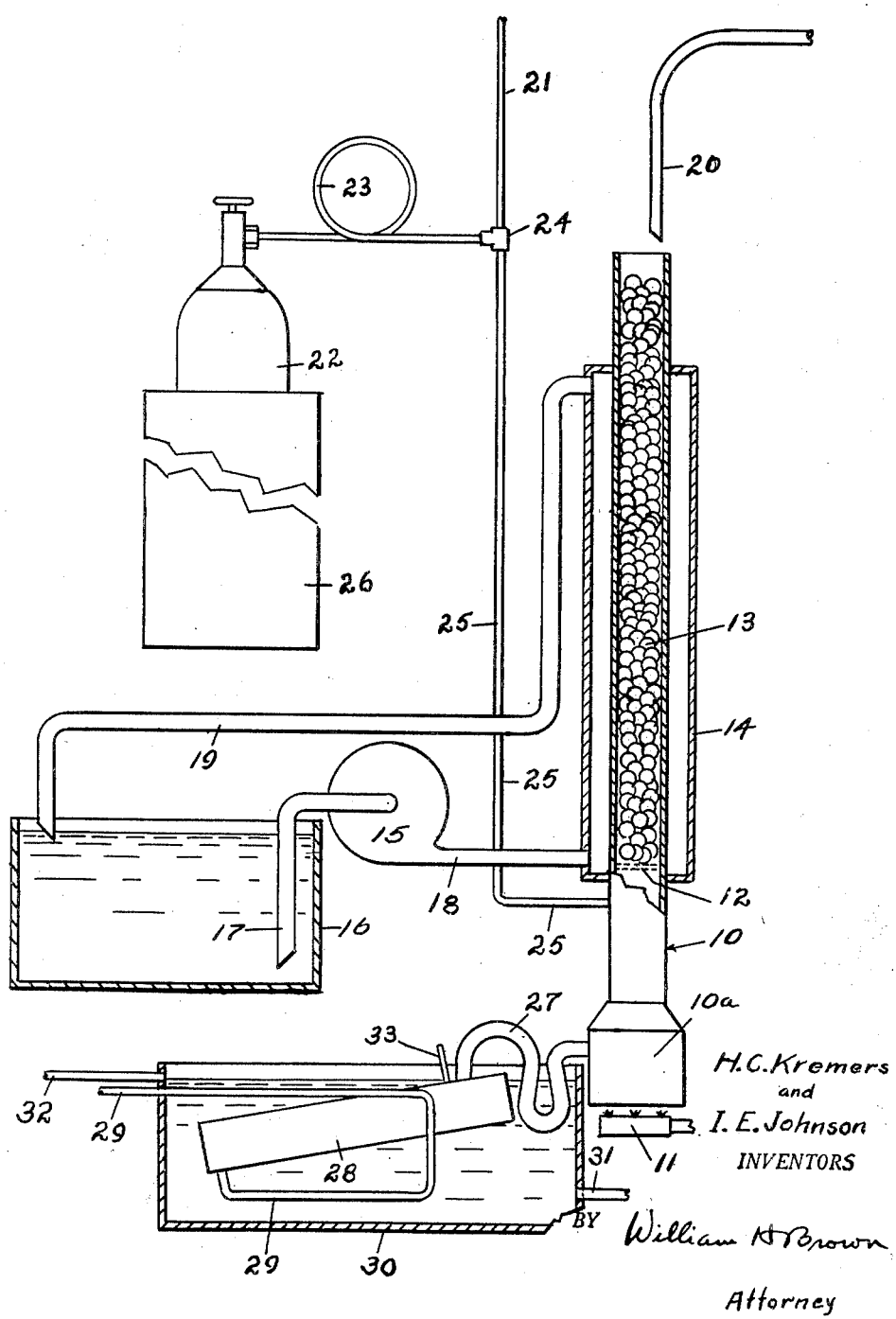

2,459,438

UNITED STATES PATENT OFFICE 2,459,438

MANUFACTURE OF HYDROFLUORIC ACID

Harry C. Kremers, Cleveland Heights, and Irwin E. Johnson, Cleveland, Ohio, assignors to The Harshaw Chemical Company, Elyria, Ohio, a corporation of Ohio Application August 23, 1945, Serial No. 612,286

2 Claims. (Cl. 23—153)

This invention relates to production of aqueous hydrofluoric acid from anhydrous hydrogen fluoride and water.

It has been recognized for some years that a high grade aqueous acid can be produced from anhydrous HF by mixing the latter with water. The object of the present invention is to provide an improved process and improved apparatus for accomplishing the mixing of water with anhydrous HF and at the same time removing impurities such as sulfur dioxide. Further objects are to provide for convenient control of the strength of the resulting aqueous acid and to provide for relatively rapid solution and purification by the use of simple equipment.

Other and more limited objects of the invention will be in part apparent and in part pointed out hereinafter in connection with the accompanying drawing wherein the figure is a diagrammatic showing of equipment suitable for use in carrying out the novel process.

In the drawing, the numeral 10 indicates a platinum reaction tower consisting of a tubular upper portion and an enlarged base or boiler portion 10a. A burner 11 is provided for boiling the content of the boiler portion 10a when necessary. Near the bottom of the tubular portion is a supporting grid or screen 12 which supports carbon packing rings 13. Surrounding the tower 10 is a jacket 14 through which cooling or heating water may be circulated by a pump 15, the water being drawn from a constant temperature bath 16 through a pipe 17 and delivered to the jacket 14 through a pipe 18, returning to the water bath 16 by a pipe 19.

Water for diluting the anhydrous HF is supplied by a pipe 20 disposed so as to deliver water over the carbon rings 13 of the packed tower 10. Compressed air is delivered to the system through a pipe 21 after being suitably purified by filters, and scrubbers (not shown). Anhydrous HF is supplied from a cylinder 22 or other suitable source through a tube 23 to a junction fitting 24 and platinum tube 25 whereby a mixture of anhydrous HF and air is delivered to the tower 10 below the grid 12. The proportion of air to HF gas may be suitably from half to double the volume of HF gas. The cylinder 22 may be kept at constant flow for a given valve setting by means of a constant temperature bath 26.

Connected with the portion 10a of the tower 10 is an intermittent siphon tube 27 composed of platinum delivering to a platinum condenser 28. The condenser 28 is drained by a platinum tube 29. Coolant for the condenser 28 is contained in a vessel 30 provided with an inlet pipe 31 and an outlet pipe 32. The condenser may be vented by a vent pipe 33.

In operation, water is allowed to flow downwardly over the carbon rings in the packed tower at a rate to cause most of it to move downwardly in thin films on the surfaces of the rings. A mixture of anhydrous HF gas and purified air in proportion from one fourth of the volume of HF to five times the volume of HF, preferably ½ to twice the volume of HF, passes upwardly and contacts the water film and HF gas is absorbed thereby to form aqueous HF. If the temperature is high enough in the packed tower, $SO_2$ will not be absorbed in the water films but will be washed out by the air which is used to dilute the anhydrous HF. If the water in the tank 16 is cold (say 0° C. to 20° C.) substantial quantities of $SO_2$ will be absorbed and HF losses will be small, but if the water in the tank 16 is hot, (say 50° C. to 100° C.) little or no $SO_2$ will be absorbed but the HF loss will be greater. At jacket temperatures from 20° C. to 50° C., some $SO_2$ is absorbed. The use of air or other inert gas as a diluent for the anhydrous HF gas provides a medium for flushing out the unabsorbed impurities. Some increase in purification at low HF loss can be obtained by boiling the content of the base portion 10a of the tower 10 while utilizing an intermediate temperature, say 20° C. to 50° C. in the water bath 16. The heater 11 need not always be used, the heat of reaction being usually sufficient. The heat of dilution is liberated mainly near the bottom of the packed tower. The coolant from the constant temperature bath is admitted to the jacket 14 at that point and so maintains a fairly constant jacket water temperature at all levels.

When an amount of aqueous acid has built up sufficiently to overflow into the condenser 28, the siphon effect drains a batch into the condenser from the portion 10a of the packed tower. A seal is produced in the lower bend of the tube 27 which prevents the escape of gas backwardly through the system. The purity of the product is controlled by varying the temperature of the water flowing through the jacket 14. HF flow and water flow are adjusted with respect to the temperature in the tower and with respect to each other to control the concentration of the product. The water in the tower jacket is usually a cooling medium even when hot water is used since the heat of reaction between HF and water keeps the actual temperature in the tower up.

Having thus described our invention what we claim is:

1. A process of continuously producing aqueous HF of uniform HF content comprising the steps of producing a mixture of gaseous anhydrous HF containing $SO_2$ as an impurity with a gas inert thereto in the proportion of from 1/4 to 5 volumes of inert gas for each volume of HF, passing the resulting gaseous mixture at a constant rate into a packed, vented column whereby it may pass upwardly therethrough, passing water downwardly through said packed column also at a constant rate whereby it absorbs HF from said gaseous mixture but the $SO_2$ is flushed out by the inert gas, maintaining the temperature in the hottest portion of said packed tower approximately constant, and removing the resulting aqueous HF.

2. A process for continuously producing aqueous HF of uniform HF content comprising the steps of producing a mixture of gaseous anhydrous HF containing $SO_2$ as an impurity with a gas inert thereto in the proportion of from 1/2 to 2 volumes of inert gas for each volume of HF, passing the resulting gaseous mixture at a constant rate into a packed, vented column whereby it may pass upwardly therethrough, passing water downwardly through said packed column also at a constant rate whereby it absorbs HF from said gaseous mixture but the $SO_2$ is flushed out by the inert gas, maintaining the temperature in the hottest portion of said packed tower approximately constant, and removing the resulting aqueous HF.

HARRY C. KREMERS.
IRWIN E. JOHNSON.

REFERENCES CITED

The following references are of record in the file of this patent:

UNITED STATES PATENTS

| Number | Name | Date |
|---|---|---|
| 1,301,325 | Sherwin | Apr. 22, 1919 |
| 1,367,993 | Stahl | Apr. 8, 1921 |
| 2,155,315 | Kremers | Apr. 18, 1939 |

FOREIGN PATENTS

| Number | Country | Date |
|---|---|---|
| 580,633 | Germany | July 14, 1933 |

OTHER REFERENCES

Kachulkov, Chemical Abstracts, vol. 31, page 7609, (1937).

Industrial and Engineering Chemistry, vol. 30, page 254, (1938).